United States Patent [19]

Carlstrom

[11] Patent Number: 4,934,208
[45] Date of Patent: Jun. 19, 1990

[54] VEHICLE TRANSMISSION SHIFTER

[75] Inventor: John D. Carlstrom, Farmington, Mich.

[73] Assignee: Chrysler Corporation, Highland Park, Mich.

[21] Appl. No.: 268,922

[22] Filed: Nov. 9, 1988

[51] Int. Cl.$^5$ ................................................ G05C 9/16
[52] U.S. Cl. .............................. 74/473 SW; 116/28.1; 74/487
[58] Field of Search .......................... 74/473 SW, 487; 116/28.1

[56] References Cited

U.S. PATENT DOCUMENTS

| | | | |
|---|---|---|---|
| 1,538,715 | 5/1925 | Mann | 74/487 X |
| 3,222,472 | 12/1965 | Elliott | 74/487 X |
| 4,261,282 | 4/1981 | Satou et al. | 116/28.1 |
| 4,480,494 | 11/1984 | Gilmore | 74/473 SW |
| 4,805,476 | 2/1989 | Beauch et al. | 74/473 SW |

Primary Examiner—Peter A. Aschenbrenner
Attorney, Agent, or Firm—Edward P. Barthel

[57] ABSTRACT

A shifter for a vehicle transmission comprises a cable aligned along an axis generally parallel to the steering column of the vehicle by a support bracket, an actuator lever pivotally secured to the support bracket for pivotal movement about a first pivot axis, a control lever whose first end is secured for pivotal movement coaxial with and corresponding to pivotal movement of the actuator so that a second end of the control lever traverses an arcuate path about the first axis, and a coupling for securing an end of the cable to the second end of the control along the longitudinal axis of the cable. The first pivot axis is aligned at an obtuse angle with respect to the second axis so that displacement of the control lever along the arcuate path is in a plane substantially coincident to the longitudinal axis of the cable. In the preferred embodiment, angular alignment between the first pivot axis and the second pivot axis is predetermined to contribute to alignment of the actuator lever toward a substantially radial position with respect to the longitudinal axis of the cable so as to simulate conventional shifter operation. Such simulated alignment of the actuator lever is also provided by a bend formed in the shift lever so that the distal end of the shift lever is positioned substantially radially with respect to the longitudinal axis of the cable.

1 Claim, 4 Drawing Sheets

VEHICLE TRANSMISSION SHIFTER

BACKGROUND OF THE INVENTION

I. Field of the Present Invention

The present invention relates generally to vehicle transmission shifting apparatus, and more particularly to such an apparatus in which a cable is displaced in response to pivotal movement of a steering column mounted shift actuator lever.

II. Description of the Prior Art

Steering column mounted shifter mechanisms are well-known and provide convenient control for selecting forward, reverse and neutral operational modes which may be available in the vehicle transmission. Such mounting of the shifter actuation lever provides a convenient control position for operation by the vehicle driver, and maintains the actuator lever in an arcuate path of movement which remains recessed behind the steering wheel mounted at the end of the column. While such pivotal or rotary movement of the actuator lever is convenient for the vehicle operator, the linkages through which the shifter lever is connected to the transmission can be very complex.

Some previously known complex linkages include numerous pivoting levers which pivot in response to movement of the actuator lever. However, such lever linkages have components with fixed geometries and thus can require substantial room for displacement of the levers making up the linkages. Another form of shifter includes a rotating shaft which pivots about its axis in response to pivoting movement of the actuating lever. However, such shafts must be torsionally and longitudinally rigid in order to operate effectively, and thus can be bulky and substantially increase the weight of the vehicle shifter mechanism. In any event, forces applied to the shifting mechanism must often be translated in various directions, depending upon the position of the transmission within the vehicle and such change in the direction of the applied forces substantially increases the complexity, as well as the strength and space requirements of the shift linkages.

Although displaceable cables are a well-known type of mechanical actuator, they are not well adapted for use with steering column mounted shift arrangements. In particular, cables are not well adapted for use with previously known steering column mounted shifters for the reason that a cable may be required to change direction numerous times before reaching the transmission. In order to avoid sharp bends in the cable, it may be necessary to occupy a substantially larger space about the steering column of the vehicle to provide less abrupt variation in the longitudinal direction of the cable. In any event, it has not heretofore been possible to apply longitudinal movement of a cable with previously known shift actuators adapted to be conveniently mounted to the steering column of the vehicle.

SUMMARY OF THE PRESENT INVENTION

The present invention overcomes the above mentioned disadvantages by providing a cable actuating shifter assembly in which the cable is substantially aligned along a longitudinal axis and actuated by a lever displaced in substantially the same manner as previously known column shift levers. In general, the shifter comprises an actuating lever extending substantially radially outwardly from the steering column and displaceable in a motion simulating pivotal movement about the axis of the column. In addition, the shifter includes means for translating motion of the actuator lever to control longitudinal displacement of a cable along the cable axis.

Preferably, the cable axis is generally parallel to and adjacent to the axis of the steering column. However, it is to be understood that the shifter need not be coupled to a steering column or aligned parallel to the steering column. For example, a shifter construction in which the cable axis is aligned substantially along a straight path between the shifter and the transmission is also within the scope of the present invention. Nevertheless, the shifter is particularly well adapted for use with front wheel drive vehicles having the transmission positioned forwardly of the passenger compartment of the vehicle. In such a vehicle, alignment of the cable axis adjacent to the steering column occupies minimal space in the passenger compartment and maintains alignment of the cable substantially along a single axis.

In the preferred embodiment, a control lever is pivotally secured at a first end to a support bracket about a first axis for movement of a second end along an arcuate path. The first axis is aligned at an obtuse angle with respect to the longitudinal axis of the cable supported by the support bracket so that the arcuate path of the control lever lies in a plane aligned at a complementary acute angle with respect to the longitudinal axis of the cable. As used herein, the term "obtuse angle" is used to refer to an angle including or greater than 90 degrees with respect to the alignment axis of the cable but not greater than 180 degrees. It is to be understood that reference to an obtuse angle refers to the general characteristic that displacement of the second end of the control lever along its arcuate path includes a component, and preferably a substantial component, of movement in the direction of the alignment axis of the cable. Such translational displacement of the cable minimizes stresses to be applied to the cable in an off-axis direction and eliminates the need for bending or otherwise changing the direction of the cable in order to actuate the transmission. Nevertheless, bends and direction changes can be tolerated if necessary, for example, to reach a particular transmission location.

In the preferred embodiment, the control lever is secured for pivotal movement coaxial with the pivoting movement of the actuator lever. However, the obtuse angle alignment for the pivotal axis for the actuator lever and the control lever preferably includes an acute angle with respect to the axis perpendicular to the alignment axis of the cable. In addition, the actuator lever includes a first elongated end portion and a second elongated end portion wherein the first elongated end portion is axially aligned at an angle with respect to the second end portion. The combination of pivot axis angle and actuator lever bend produces a substantially radially extending actuator lever which appears to the operator to be displaceable in a rotary movement simulating well-known pivoting movement about the steering column axis. However, arcuate movement of the control lever remains substantially aligned in a direction corresponding to the longitudinal displacement of the cable.

Positioning of the actuator lever can be controlled by clutch means for selectively limiting pivotal displacement of the actuator lever about the first axis. A simple pawl and gate actuator can be utilized by pivotally connecting the actuator lever to a clutch housing pivotally secured about the first axis. The shifter may also include a transmission position indicator having a cable which is also adapted for connection to the control lever.

Thus, the present invention provides a simple, compact, column mounted shifter with an actuating cable. The shifter eliminates redirection of and thus multiple supports for the cable actuating the transmission. In addition, the shifter provides a familiar and readily understandable shift pattern to the operator of the vehicle. Furthermore, the device is more compact than previously known column mounted shifters. Moreover, the shifter does not require complex linkages between the shifter mechanism and the transmission actuating link.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF A PREFERRED EMBODIMENT

Figure 1:
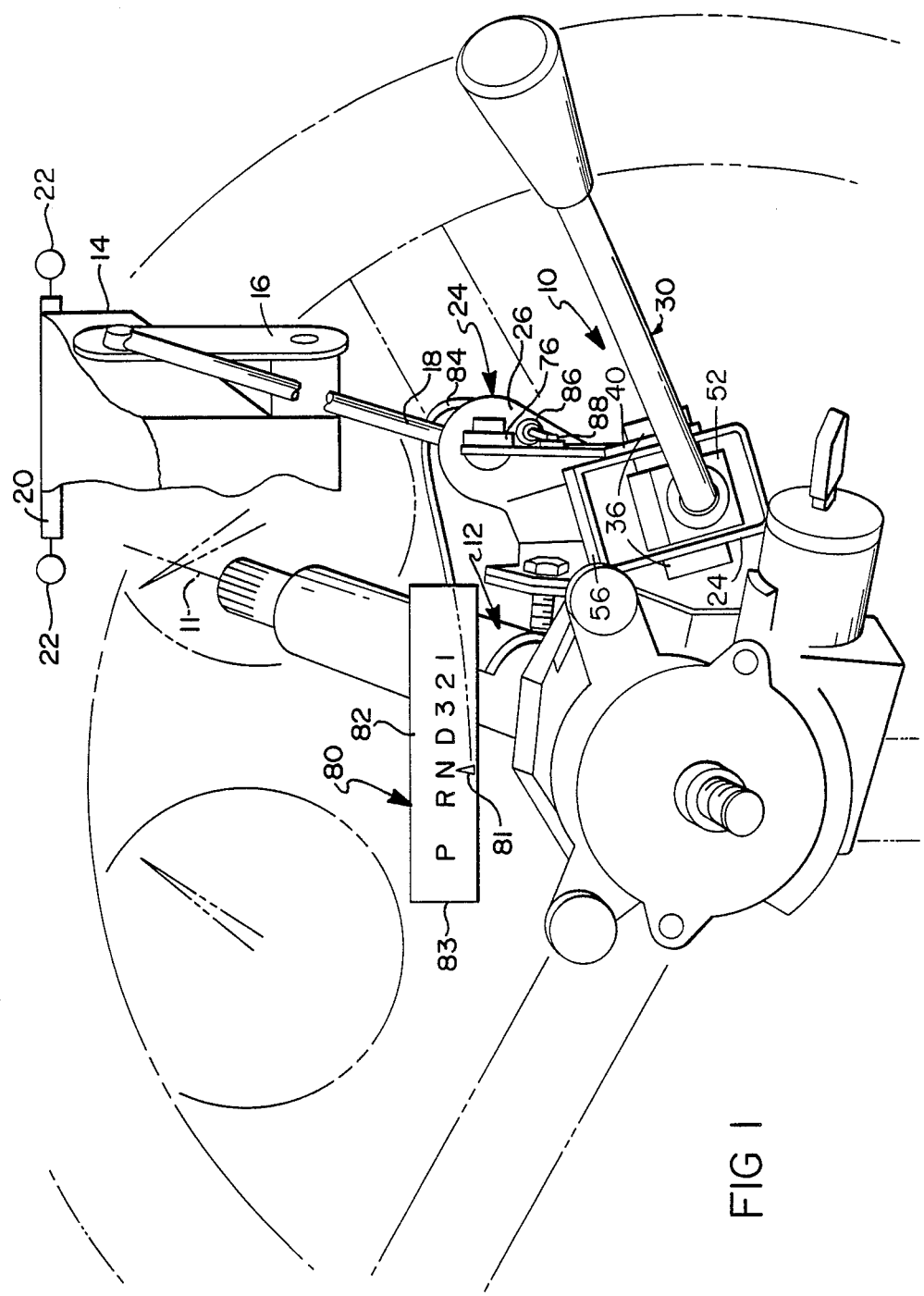
FIG. 1 is a perspective view of a shifter assembly constructed according to the present invention with diagrammatic representations of related structure.

Referring first to FIG. 1, a column mounted shifter 10 according to the present invention is thereshown coupled to a steering column housing 12 extending into a passenger compartment from a dash panel of a motor vehicle. For the sake of clarity, the dash panel is not shown so that a diagrammatic representation of a transmission 14 and its selector link 16 are shown coupled to the actuating cable 18 of the shifter 10. In the preferred embodiment, the transmission 14 is an automatic transmission located forwardly of the passenger compartment so that the cable can be aligned along substantially a single axis between the shifter actuating mechanism and the transmission. Of course, the transmission couples the engine 2 to driven wheels 22 in a well-known manner to adjust the application of power from the engine to the driven wheels.

While the shifter 10 of the preferred embodiment is disclosed as being directly supported by steering column housing 12, it is to be understood that the term column-mounted shifter as used in this detailed description is not to be understood to require direct connection between the shifter and the column housing as will be described in greater detail hereinafter. Rather, it is to be understood that the shifter mechanism can be independently supported by other structure whereby the actuating cable 18 is longitudinally aligned in a desired direction.

Nevertheless, with the alignment shown in the preferred embodiment, the desired direction includes the advantages of both a generally parallel and adjacent alignment with respect to the steering column as well as an alignment substantially along a single axis between the shifter 10 and the transmission 14.

Of course, positioning of the cable near or adjacent to the steering column preserves occupancy space within the passenger compartment. Nevertheless, other positions or alignment of the shifter mechanism may be employed for convenience without departing from the scope of the present invention so long as displacement of the cable 18 by the shifter actuating mechanism is directed substantially along the axis of the cable in a manner to be described in greater detail hereinafter.

As shown in FIG. 1, cable 18 is aligned generally parallel to the axis 11 of the steering column and adjacent thereto so as to provide a compact and familiar arrangement of driving controls for the vehicle operator. Support for this shifter assembly is provided by a bracket 24 adapted to be bolted to the steering column housing 12. The bracket 24 supports the shifter actuating mechanism 28 and also includes a cable support 26 to provide a fixed alignment for the cable along substantially a single longitudinal axis 27.

The cable 18 is retained in a sheath held within a cable mount 31 which is retained in an aperture in the support 26 in a well-known manner. An end of the cable 18 is secured by a pivot coupling 76 to an end 74 (FIG. 3) of the control lever 40. The other end of the cable 18 is secured by a similar coupling to the actuator link 16 of the transmission 14.

Figure 2:
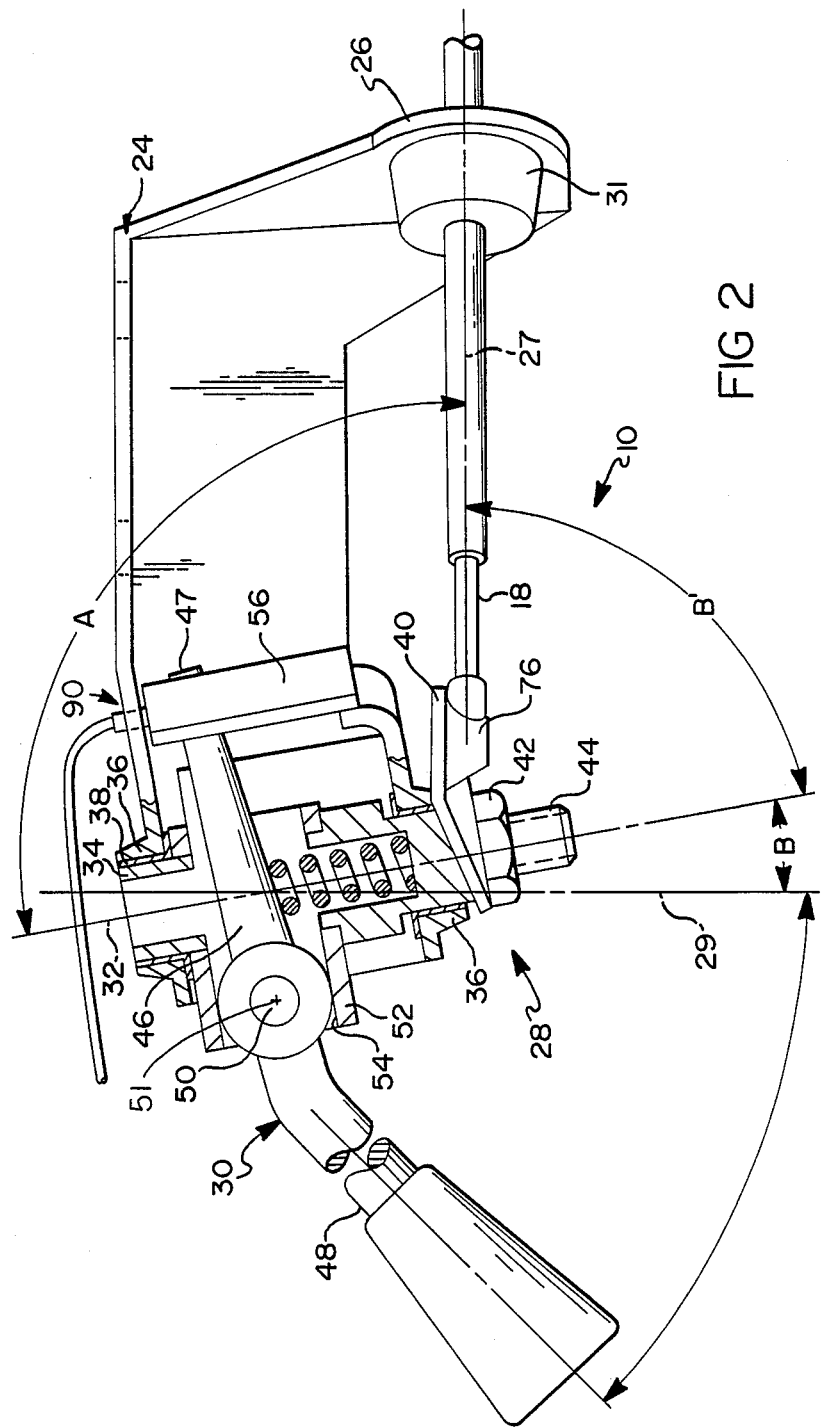
FIG. 2 is a top plan view of the shifter mechanism shown in FIG. 1 with portions broken away for the sake of clarity.

The shifter actuating mechanism 28 includes an actuator lever 30 and means for pivotally securing the actuator to the support bracket about a first pivot axis. As best shown in FIG. 2, the pivot axis 32 is aligned at an obtuse angle A which is at least 90 degrees, and preferably more but not greater than 180 degrees, with respect to the longitudinal axis 27 of the cable 18. Accordingly, a complementary angle from 0 degrees up to but not including 90 degrees is formed between pivot axis 32 and the axis 29 perpendicular to the alignment axis 27.

In the preferred embodiment, the means for pivoting is formed by a clutch housing 34 rotatably channelled in spaced-apart supports 36 formed on the bracket 24 and having registering apertures aligned on the axis 32. A pair of bearings 38 rotatably entrain the clutch housing 34 on the axis 32.

The clutch housing 34 provides a convenient means for securing the control lever 40 for coaxial pivotal displacement about the axis 32 in conjunction with pivoting movement of the actuator lever 30. For example, control lever 40 includes an eccentric land 41 mating with a corresponding land on a stud 44 extending outwardly from the clutch housing 34, and is locked into position on the clutch housing 34 by means of a nut 42 threadably engaged on the stud 44.

As is also shown in FIG. 2, the actuator lever 30 includes a first elongated end portion 46 and a second elongated end portion 48 aligned at an angle with respect to the end portion 46. The bend in the actuator lever 30 orients the elongated end portion 48 toward a parallel relationship with respect to the axis 29. Moreover, further increases in the angle A also tend to reposition the elongated end portion 48 in a more nearly parallel relationship to the axis 29. Thus, the end 48 of the actuating lever can be substantially radially oriented from the axis 27 by adjustment of the angle A and the angle between the lever end portions 46 and 48. As will be discussed in further detail hereinafter, these angular relationships serve to simulate the conventional radial displacement of column mounted shift levers employed in other previously known shifter mechanisms.

Figure 3:
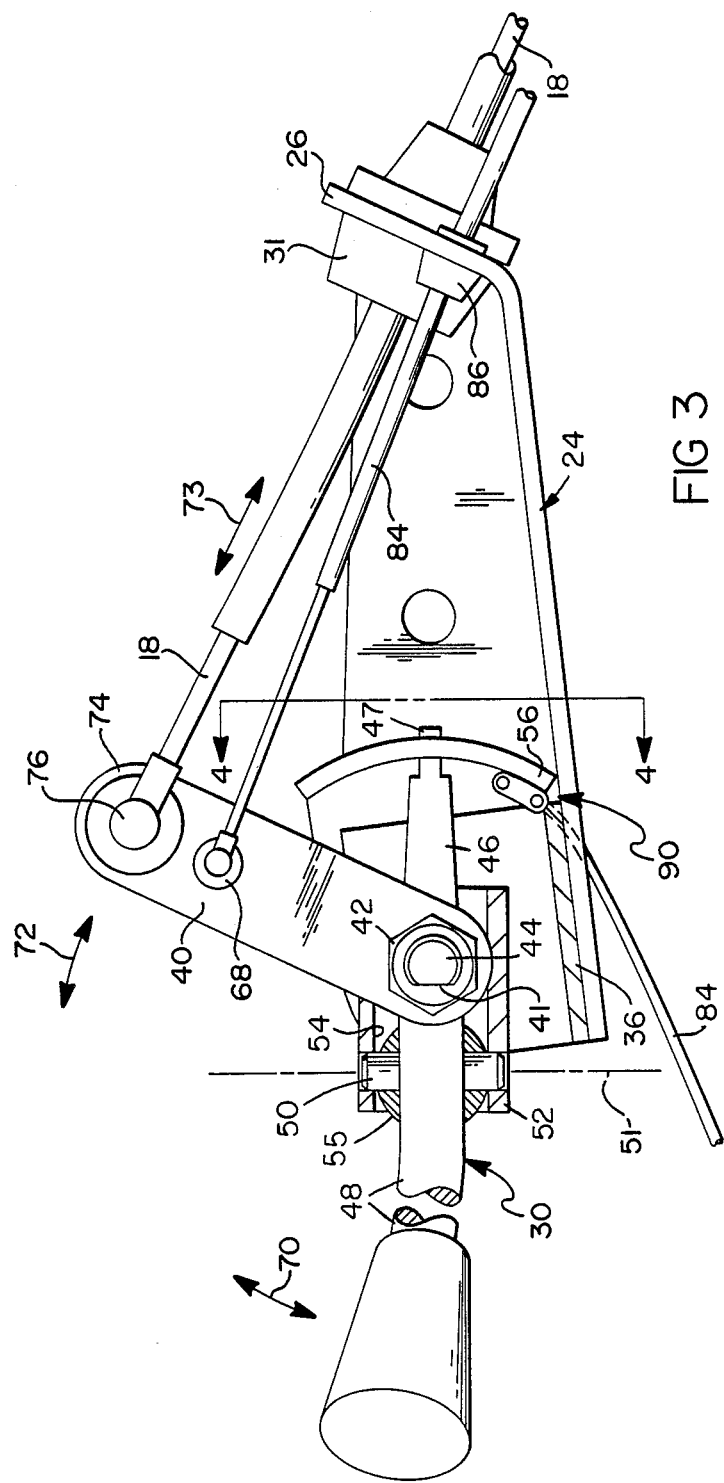
FIG. 3 is a side elevational view of the shifter apparatus shown in FIGS. 1 and 2 with portions broken away for the sake of clarity.

Referring now to FIGS. 2 and 3, the clutch housing 34 forms a portion of the clutch means for selectively limiting pivotal displacement of the actuator lever 30. A pivot pin 50 extends through a housing portion 52 including a throughbore 54 substantially transverse to the axis 32. The pivot pin 50 extends through a ball-shaped guide body 55 guiding displacement of the lever end portion 46 within the throughbore 54 about the axis 51 of the pin 50. The free end 47 of the end portion 46 extends outwardly from the throughbore 54 and forms a pawl which can become engaged within recesses in a gate bracket 56.

Figure 4:
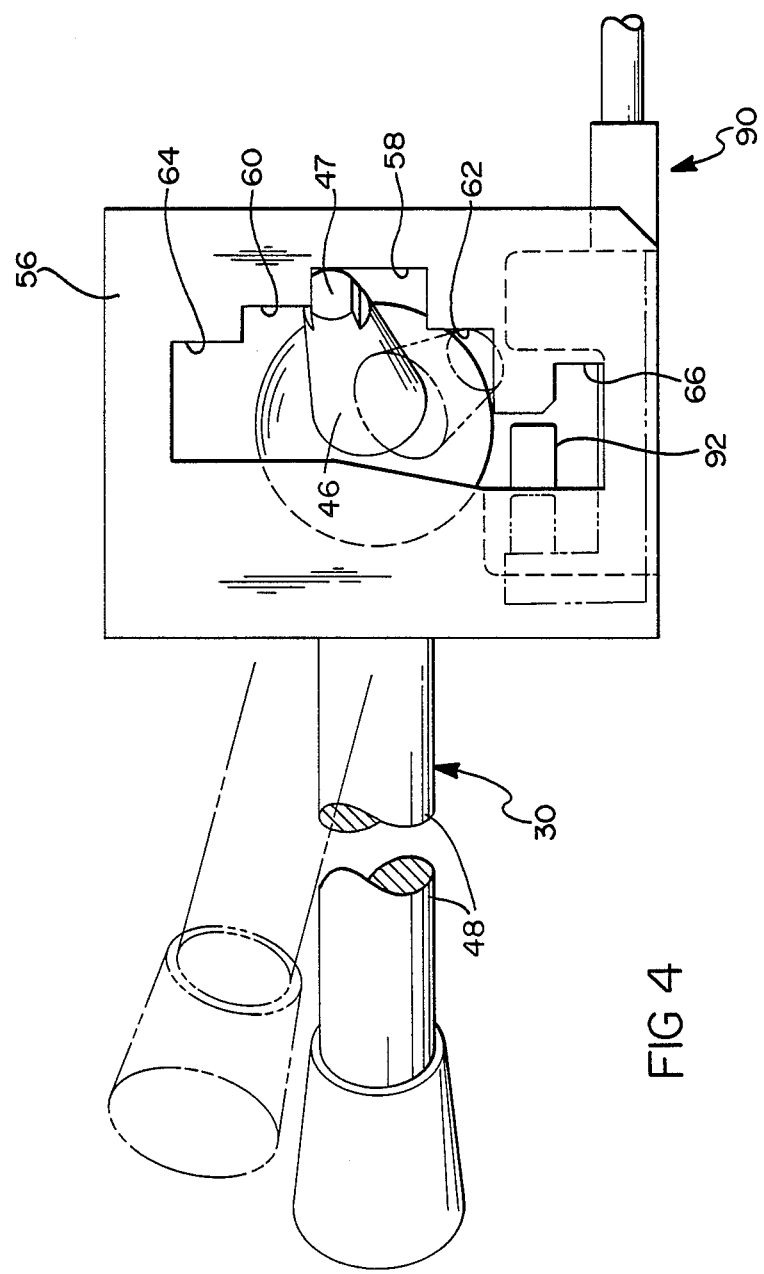
FIG. 4 is an enlarged sectional view taken substantially along the lines 4—4 in FIG. 3 with parts removed for the sake of clarity.

As best shown in FIG. 4, the end 47 is received in recesses in the gate bracket 56 whereby pivoting of the actuator lever 30 about the pivot pin 50 displaces the end 47 outwardly from the recesses, for example, to the left in FIG. 4. With the pawl 47 removed from the recess 58, the lever can be pivoted about the axis 32 so as to raise or lower the end 47 into one of the adjacent openings, for example recess 60 or recess 62. Further pivoting of the actuator lever 30 about the pivot pin 50, for example, further to the left in FIG. 4, permits the end 47 to be received on additional lands 64 and 66. Of course, the number of lands or recesses within the gate bracket 56 is determined by the number of positions necessary to fully operate the transmission 14.

Furthermore, the gate structure in the preferred embodiment is well adapted to incorporate a park lock mechanism such as the ignition switched, cable operated park lock 90. With the lever end 47 in the park recess 66 and the ignition turned off, a cable operated finger 92 extends from a bracket mounted housing and above the recess 66, as shown in solid line in FIG. 4, to prevent displacement of the actuator lever 30 to another recess. When the ignition switch is turned, the cable 18 retracts the finger 92, as shown in phantom line in FIG. 4, from its position over the recess 66 and permits movement of lever end 47 to other gate recesses.

Referring now to FIG. 3, it will be understood that pivoting movement of the actuator lever 30 in the direction shown by arrow 70, by pivoting around the pivot axis 32, correspondingly causes arcuate displacement of the control lever 40 by means of the clutch housing 34 connecting these two levers together. The second end 74 of the control lever 40 includes a coupling 76 for pivotally mounting an end of the actuator cable 18. The arcuate path followed by the second end 74 of the control lever 40, as represented by the reference character 72, causes substantially longitudinal displacement of the actuating cable 18. Thus, as shown in FIG. 1, the control lever causes arcuate displacement of the pivoted link 16 so as to adjust the operational mode of transmission 14 in a well-known manner.

Although the most direct displacement of the cable 18 by arcuate movement of control lever 40 is accomplished when pivot axis 32 is perpendicular to the longitudinal axis 27, it will be evident from FIG. 2 that the angular offset represented by angle B in FIG. 2 is desirable for the purpose of orienting the end portion 48 of actuator lever 30 toward a position approaching a parallel relationship with the axis 29. Nevertheless, minor angular offset still provides a substantial component of displacement in the direction of the arrow 73 shown in FIG. 3 to provide substantially longitudinal displacement of the cable 18 and thus operable displacement of the actuator 16 to engage the different operating modes of the transmission 14. Nevertheless, the magnitude of the angle B is preferably limited so that the cable 18 does not experience a substantial shift away from the axis 27 during movement of the control lever 40 along its arcuate path.

Nevertheless, as previously mentioned, the bend in the actuator lever 30 between the elongated portions 48 and 46 also serves to enable the lever portion 48 to approach a parallel relationship with respect to perpendicular axis 29. As a result, the alignment of the lever portion 48 simulates conventional radial positioning of the actuator lever behind the steering wheel, while the clutch means provides selectively adjustable positioning of the actuator lever in substantially the same manner as previously known shifter mechanisms. Nevertheless, pivoting of the actuator lever 30 about the pivot axis 32 provides substantially direct longitudinal displacement of the cable 18 along the axis 27.

As also shown in FIGS. 1 and 3, the shifter may also include a shift position indicator diagrammatically represented at 80. The indicator 80 includes a cable actuated cursor 81 slidably carried in a housing 83 covered by a display panel 82. A cable 84 extends through a mount 86 also supported by support member 26 and is connected at one end to the cursor 81. The other end of the cable 84 is coupled by a coupling 88 similar to the coupling 76 to the control lever 40. Consequently, displacement of the control lever 40 provides a visible display consistent with the position of the control lever 40 and thus the position of the transmission actuator link 16 to represent the mode of transmission operation.

Thus, the shifter of the present invention avoids the need for significant changes in direction and reorientation of the cable as it extends between the shifter and the transmission actuator diagrammatically represented in the preferred embodiment by the link 16. Moreover, the shifter conveniently simulates the familiar motion of previously known column-mounted shift levers which pivot about the steering column axis. Furthermore, the shifter construction minimizes space requirements in the passenger compartment and provides a relatively simple and lightweight assembly when used with a forward mounted transmission as shown in the preferred embodiment.

Having thus described the present invention, many modifications thereto will become apparent to those skilled in the art to which it pertains without departing from the scope and spirit of the present invention as defined in the appended claims.

What is claimed is:

1. In combination with a motor vehicle having a transmission mounted forwardly of the passenger compartment, a displaceable selector shifting link on said transmission, a steering column supported by a steering column housing and with the steering column axis extending toward a control position in the passenger compartment, and bracket means supporting a column mounted manual shifter on said steering column housing, the improvement comprising:

an actuating cable coupled to one free end of said shifting link;

means for aligning said actuating cable along a substantially singular longitudinal alignment axis from a control position in the passenger compartment to said selector shifting link, said actuating cable longitudinal alignment axis being aligned generally parallel to an adjacent said steering column axis;

said column mounted shifter including an actuator lever pivotally mounted about a pivot pin axis at said passenger compartment control position and a control lever secured at its one end for pivotal displacement about a pivot axis corresponding to displacement of said actuator lever;

coupling means for pivotally mounting said actuating cable to the other end said control lever, wherein said pivot axis is aligned at an obtuse angle with respect to said actuating cable longitudinal alignment axis, whereby displacement of said control lever provides substantially longitudinally directed displacement of said actuating cable;

means for simulating arcuate movement of said actuator lever about said actuating cable longitudinal alignment axis;

said simulating means comprises said actuator lever being formed with a single bend defining a first elongated end portion fixed to a transversely extending pivot pin defining said pivot pin axis and a second elongated end portion, said first elongated end portion having a co-linear extension at its free end in the form of a pawl engageable in a selected one of a plurality of recesses in a gate bracket mounted on said bracket means, whereby pivoting of said actuator lever in one direction about said pivot pin axis displaces said pawl away from said recesses and pivoting said actuator lever in the other direction about said pivot pin axis displaces said pawl toward said recesses;

wherein said first elongated end portion is axially aligned at an obtuse angle with respect to said second elongated end portion, such that said bend orients said second elongated end portion toward an orthogonal relationship with said actuating cable alignment axis; and said simulating means further comprises means for aligning said pivot axis at an obtuse angle of about 100° with respect to said actuating cable longitudinal alignment axis such that said second elongated end portion can be substantially radially oriented from said cable alignment axis whereby said actuator lever simulates conventional column mounted shifter operation.

* * * * *